(12) United States Patent
Müller

(10) Patent No.: US 6,639,514 B1
(45) Date of Patent: Oct. 28, 2003

(54) METHOD FOR SELECTING AND WRITING INTO RFID-TRANSPONDERS

(75) Inventor: Philipp Müller, Greifensee (CH)

(73) Assignee: Lucatron AG, Baar (CH)

( * ) Notice: Subject to any disclaimer, the term of this patent is extended or adjusted under 35 U.S.C. 154(b) by 0 days.

(21) Appl. No.: 10/049,630

(22) PCT Filed: Oct. 16, 2000

(86) PCT No.: PCT/EP00/10168
§ 371 (c)(1), (2), (4) Date: Feb. 25, 2002

(87) PCT Pub. No.: WO01/29753
PCT Pub. Date: Apr. 26, 2001

(30) Foreign Application Priority Data

Oct. 18, 1999 (DE) .......................... 199 50 145

(51) Int. Cl.[7] .................. G08B 13/14; H04Q 5/22; G06E 17/60
(52) U.S. Cl. ................. 340/572.5; 340/572.1; 340/10.1; 235/385
(58) Field of Search ........ 340/572.1–572.5, 340/572.7, 5.92, 10.1, 10.2, 10.51, 10.52, 10.3, 10.34; 235/385

(56) References Cited

U.S. PATENT DOCUMENTS

| | | | |
|---|---|---|---|
| 5,083,013 A | 1/1992 | Levionnais et al. | ......... 235/449 |
| 5,446,447 A | 8/1995 | Carney et al. | ........... 340/572.4 |
| 5,726,630 A | 3/1998 | Marsh et al. | ............... 340/10.2 |
| 6,356,197 B1 * | 3/2002 | Patterson et al. | ........ 340/572.1 |
| 2002/0196126 A1 * | 12/2002 | Eisenberg et al. | ......... 340/10.2 |

FOREIGN PATENT DOCUMENTS

| | | |
|---|---|---|
| DE | 44 36 977 A1 | 4/1996 |
| DE | 195 14 601 A1 | 10/1996 |
| EP | 0 316 963 | 5/1989 |
| EP | 0 707 296 B1 | 10/1996 |

* cited by examiner

Primary Examiner—Daniel J. Wu
Assistant Examiner—Anne V. Lai
(74) Attorney, Agent, or Firm—Dennison, Schultz & Dougherty

(57) ABSTRACT

Method and system for reading out and writing to RFID-transponders with inductive coupling including a read/write unit with a transmission frequency $f_{s1}$ defined as a basic transmission frequency and a plurality of transponders operated at a resonance frequency $f_R$. The resonance frequency $f_R$ is fixedly predetermined, then for operating conditions with a high distance range, the resonance frequency $f_R$ equal to the basic transmission frequency $f_{s1}$ is selected. For operating conditions with a high recognition rate with a plurality of transponders located within a detection field, the basic transmission frequency $f_{s1}$ is reduced to a fixed alternative value $f_{s2}$. This procedure guarantees reliable communication between the transponders and the read/write unit.

7 Claims, 5 Drawing Sheets

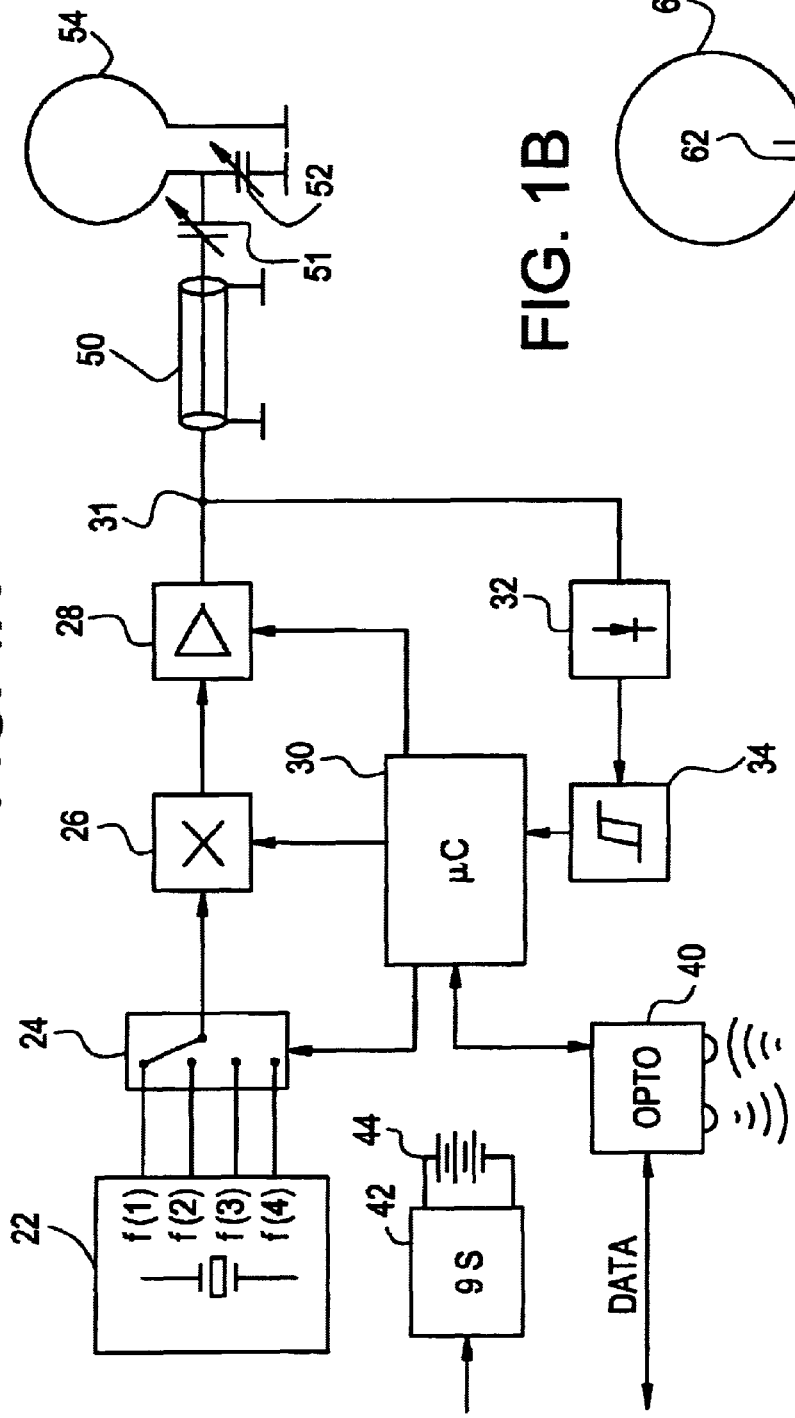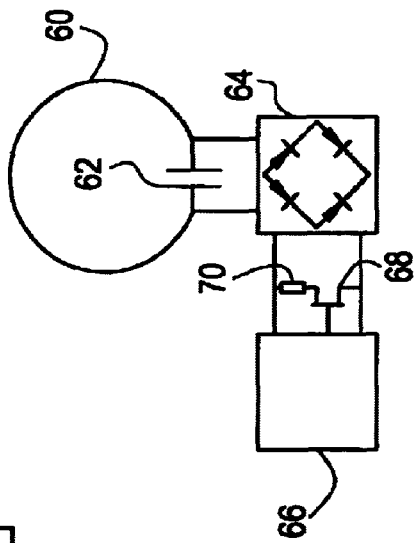

METHOD FOR SELECTING AND WRITING INTO RFID-TRANSPONDERS

BACKGROUND OF THE INVENTION

The present invention relates to a method for reading out and writing to RFID-transponders with an inductive coupling, using a read/write unit, wherein the transponders operate at a resonance frequency. The invention further relates to a system for reading out and writing to RFID-transponders, wherein the system comprises a transponder, which is disposed on a carrier and has a resonant circuit with a resonance frequency, a receiving unit and a read/write unit with a transmitter/receiver.

RFID-systems are becoming increasingly more frequently used for means of contact-free, automatic identification purposes. Approx. 90% of all sold RFID-systems are nowadays inductively-coupled systems with an inductive coupling between the reading device and the transponder. Such systems, so-called remote-coupling systems generally function in the ranges of up to 1m in the read/write operation.

The transmission frequencies used are frequencies below 135 kHz or the frequencies 6.78 MHz, 13.56 MHz and 27.125 MHz, i.e. the ISM frequency ranges which are held free especially for industrial, scientific or medical purposes. Depending upon the frequencies used, differences occur in the data transmission rates, clock frequencies, output, etc.

It is possible nowadays to use RFID-labels to identify goods and other objects as these labels can now be produced practically as thin as conventional adhesive labels and thus are not generally recognised by the user as being RFID-labels. For example, RFID-labels can be adhered or laminated to books, periodicals or similar documents.

RFID-systems which function in the radio frequency range (3 MHz to 30 MHz) operate with LC-resonant circuits at a resonance frequency $f_R$. If a magnetic alternating field acts with a frequency $f_s$ on the transponder of an RFID-label, then the resonant circuit of the transponder starts to respond and is excited to resonance oscillation. In so doing it takes energy from the magnetic alternating field, which for example can be acquired by increasing the coil current or the voltage drop at the internal resistor in the transmitter circuit. In this manner the operating voltage for the transponder chip can also be produced.

In the case of EAS-systems, i.e. electronic article security, a warble frequency is used. The transmitter frequency continuously scans a frequency range. This can be recognised by the energy absorption which occurs at an unknown resonance frequency of a transponder. DE 195 14 601 A1 describes an EAS-system of this type which has a broadband pre-amplifier which for example in the case of two transponder types passes through their two frequency ranges one after the other.

The drop in voltage in the transmitter circuit as a consequence of the receiving transponder being excited to oscillate is exploited during load modulation, when by means of switching on and off the load resistor of the transponder voltage changes are caused at the antenna of the transmitter and thus amplitude modulation of the antenna voltage is effected.

If two RFID-labels are located in close proximity to each other, possibly stacked one on top of the other in a document file or adjacent to each other on a bookshelf, then these have a mutual effect on each other during reception, i.e. they receive approximately with identical strength an in-phase signal from the transmitter and coupling effects occur. If they lie precisely one above the other, then there is practically a common coil, wherein the two capacitors are connected in parallel. Thus a frequency displacement occurs, i.e. a change in the resonance frequency. This leads to the relevant read device only being able to receive the data in a limited form or not being able to receive the data at all.

Tests have shown that the resonance frequency of an RFID-label always displaces downwards when a second RFID-label comes into the coupling range of the first. In the extreme case, a rigid coupling can occur, wherein the resonance frequency of the two RFID-labels then amounts to $$f_R/\sqrt{2}$$

Even when using high field strengths, i.e. high transmitter output, it is not always possible to communicate at the transmission frequency $f_s$. Depending upon the coupling level and resonant frequency of the transponder circuits, zero settings can lie above the resonance frequency which has been displaced downwards. If such a zero setting occurs particularly where the transmission frequency $f_s$ is used, then the chip no longer functions.

This is illustrated with reference to the replacement circuit diagrams in FIG. 4. There is located in the transmitter branch of the transmitter/receiver A an oscillator 2 with a frequency $f_s$, whose output signal is transmitted, where appropriate after modulation, to an output end phase 4. The receiving branch which commences immediately at the antenna bush is provided with a demodulator 6 and a band pass filter 8 or a different filter. The antenna is a coil 10 with inductivity $L_s$. The replacement circuit diagrams of two RFID-labels a,b are also illustrated. These include in each case a coil 12 with inductivity $L_1$ and $L_2$ and a capacitance 14 parallel to the transponder chip 16. The coupling ratios are illustrated by lines, wherein $k_s$ represents the coupling transmitter/receiver and the transponder and k represents the coupling between the two transponders. If there are differences in size (and thus coupling) or frequency of the RFID-labels, then the mentioned deletions occur.

FIGS. 5 and 6 illustrate simulations of this process of the undesired coupling between two adjacent RFID-labels with like and unlike resonance frequency.

In the first example (FIG. 5) the frequency responses for transponders with identical resonance frequency are illustrated, where there is no coupling (k=0) at 13.56 MHz and total coupling (k=1) at approx. 10 MHz. Thus, as the coupling increases the occurring resonance frequency drops to lower frequencies.

In the case of different resonance frequencies as shown by the second example illustrated in FIG. 6, there is in fact again no coupling (k=0) at 13.56 MHz and the coupling increases [sic] to lower frequencies, wherein again total coupling (k=1) occurs at approx. 10 MHz. However, a zero setting x has formed just above 13.56 MHz, so that under certain conditions the chip can fail.

It is known to use RFID-systems which operate in the microwave range to eliminate randomly occurring interference signals, where the transponders operate at several resonance frequencies. This is the case with an RFID-system described in U.S. Pat. No. 5,446,447 for reducing the read time.

Furthermore, RFID-systems with transmission frequencies in the microwave range have been used, where the transmission signal is modulated with a signal of e.g. 1 kHz and in addition to the resonance frequency the second harmonic of the transponder is also detected. Following demodulation and the passing through of a 1 kHz detector it is possible in a reliable manner to distinguish between the received transponder signals and interference signals and thus false alarms are avoided. However, disadvantages of these RFID-systems are the influences exerted by the multi-path and running-time effects.

SUMMARY OF THE INVENTION

The object of the invention is to provide a method which renders it possible to perform a reliable operation, in particular communication and antenna feeding, even if several transponders are located over a large spatial area.

Thus, in the case of the method in accordance with the invention for reading out and writing to RFID-transponders with inductive coupling using a read/write unit, the transponders operate at a fixed resonance frequency. The transmission frequency is reduced from a transmission basic frequency according to this resonance frequency for operating conditions at a high range to a fixed alternative value of the transmission frequency for operating conditions with a high recognition rate, so that a reliable communication between transponder and read/write unit is guaranteed.

The method in accordance with the invention is suitable for use in the range of approx. 10 kHz to approx. 30 MHz. It is preferably used in the radio frequency range. In preference, the following values are provided as frequency combinations:

a) $f_R$=13.56 MHz; $f_{s1}$=13.56 MHz, $f_{s2}$=6.78 MHz
b) $f_R$=27,125 MHz; $f_{s1}$=27,125 MHz, $f_{s2}$=13.56 MHz, $f_{s3}$=6.78 MHz

The manufacturing tolerances allow the transponder resonance frequency to be varied by approx.±2%.

By providing two operating frequencies it is possible on the one hand to eliminate interference caused by other transponders located in the proximity or in any case to reduce it greatly and on the other hand to operate with the necessary range. In an advantageous manner the resonant circuits of the transponders are adjusted so that they individually operate to an optimum on the transmission basic frequency and also have the greatest range there.

If it is to be assumed that in the proximity of a transponder there are other transponders whose signals could interfere with the communication, the operating frequency, i.e. the transmission frequency of the transmit/read unit, is reduced from about 13.56 MHz to the (or a) lower value 6.78 MHz which thus lies further away from the resonance frequency 13.56 MHz of the transponder. As a consequence, the likelihood of interference is reduced and the recognition rate is increased, as is necessary for densely packed RFID labels. It is thus possible in the case of differing inquiry frequency and resonance frequency to detect with a reliable recognition rate many transponders with the same resonance frequency simultaneously in the read field. The transmission range is automatically lower in the case of a reduced transmission frequency. If, on the other hand, a higher range (recognition distance) of the transmitter is required and less interference is anticipated, then the higher transmission frequency is set. The method in accordance with the invention thus provides for the same transponders to operate with different transmission devices irrespective of the on-site conditions.

Thus, for example, a gate system at the exit of a library, a warehouse or a sales outlet can transmit at the basic frequency (e.g. 13.56 MHz), since little interference from other transponders is to be expected at this location. On the contrary, the transmission range here is greater. However, the read/write units of the warehouse and sales management operate at a lower alternative transmission frequency (e.g.

6.78 MHz) as here the range is not so important, but extensive protection against interference is.

The system in accordance with the invention for reading out and writing to RFID-transponders which is suitable in particular for implementing the method in accordance with the invention comprises a transponder which is disposed on a carrier and has a resonant circuit with a resonance frequency, a receiving unit and a read/write unit with a transmitter/receiver, wherein the resonant circuit has a fixed resonance frequency and the transmitter/receiver of the read/write unit has a lower transmission frequency (transmission frequencies) according to the resonance frequencies of the transponder as an alternative to the basic transmission frequency.

In so doing, transmitters having several adjustable transmission frequencies, for example 13.56 MHz and 6.78 MHz can be used in many ways.

The system in accordance with the invention can preferably be used with extremely thin labels which are embedded in the most varied of goods.

The method and system in accordance with the invention for reading out and writing to RFID-transponders can be used as a replacement for optical barcode systems (retail, logistics, warehouse management); as a replacement for SmartCards (payment cards, guarantee cards, discount cards); as means of identification (books, documents, passes, tickets, certificates); to ensure copyright protection (books, dresses, sound media). This list is merely an example and is by no means complete. In comparison to the conventional systems, when using RFID-transponders the significant advantages are a high read rate and the lack of dependency on the positioning, meteorological conditions and the absence of wear. One or more transponders can be supplied with sufficient operating voltage, so that these can become active and can produce a response by means of load modulation.

This response is transmitted synchronously with respect to the carrier signal but on an integral ratio thereto, wherein the clock in the transponder chip is obtained by separation from the transmission signal. In one embodiment an amplitude-modulated auxiliary carrier with a frequency $f_s/32$ is used as the return channel, i.e. the return channel is on $f_s=f_s\pm f_s/32$.

BRIEF DESCRIPTION OF THE DRAWINGS

The invention is described in detail hereinunder with reference to preferred exemplified embodiments, wherein the illustration serves merely for illustration purposes and should not limit the invention to the feature combinations illustrated. In the drawing:

FIG. 1 shows a block diagram of a read/write circuit in accordance with the invention.

DESCRIPTION OF THE PREFERRED EMBODIMENTS

Figure 3:
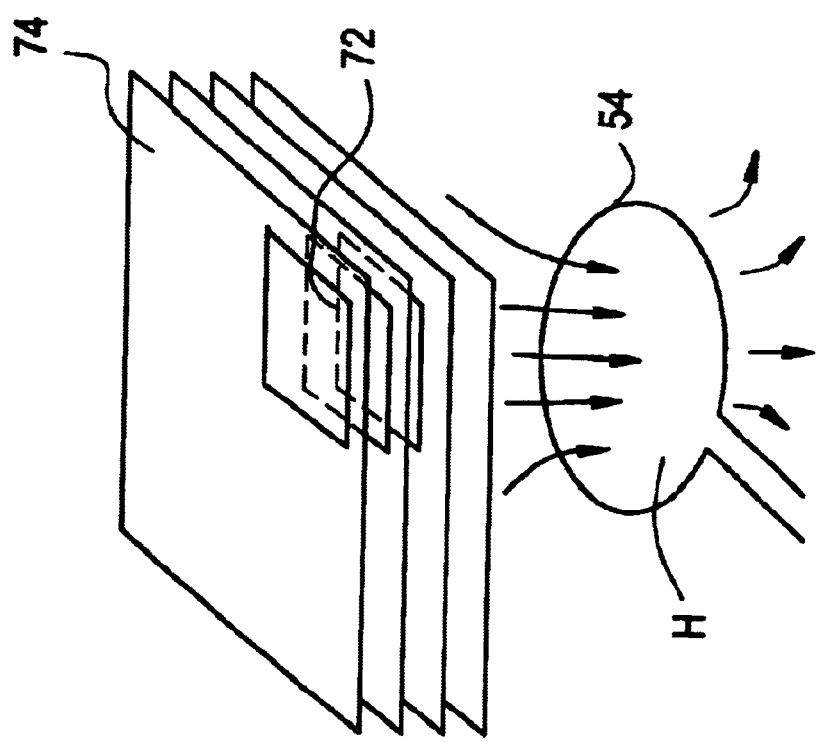
FIG. 3 shows an example for use of RFID-labels in accordance with the invention in a document file.

The invention is described hereinunder with reference to an exemplified embodiment of a read/write circuit which is illustrated in FIG. 1. The first to be described is the structure of part (a) of the read/write unit. A voltage supply 42 can be connected to the supply network or alternatively can be provided via a battery or accumulator. In the illustrated exemplified embodiment the voltage supply 42 is connected to the supply network with 230 V and the supply voltage can be measured at the output 44.

The transmission branch of the read/write circuit comprises an oscillator (quartz oscillator) 22 with four outputs f(1), f(2), f(3), f(4) for four transmission frequencies. A selection switch 24 controlled by a micro-controller 30 is connected at the input side in each case to a selected one of the four outputs, in this case output f(1) of the oscillator 22 and at the output side to a modulator 26. The carrier signals transmitted by the oscillator 22 with the transmit commands and data are modulated in the modulator 26. An output amplifier 28 is connected to the output of the modulator 26 and is connected to the micro-controller 30 which controls its output power. The transmit signal amplified in the output amplifier 28 is passed via a line (coaxial line with 50 Ω impedance) 50 to an antenna adaption circuit which comprises two variable capacitors 51, 52. The capacitors 51, 52 must possibly be tuned according to the transmit frequency in order to be able to perform the required impedance transformation, wherein the dimensioning of the capacitance values is preferably controlled via the micro-controller 30. The transmit signal is then emitted via an antenna 54.

The receiving branch begins at the nodal point 31, where the voltage variation induced into the antenna 54 is measured. A demodulator comprises a peak value rectifier 32 and a threshold switch 34 and is connected to the micro-controller 30 which processes the demodulated signals. An optointerface 40 is connected to the output of the micro-controller 30. A data transfer to a control computer can also be provided, wherein commands and data can also be input into the micro-controller 30 via the same line, as indicated by the double arrow (DATA).

FIG. 1 further illustrates at (b) the part of the transponder circuit. This comprises an antenna 60 with a capacitor 62. A full wave rectifier 64 rectifies the voltage induced by the read/write unit, i.e. the magnetic alternating field emitted by the antenna 54. The signals which it emits are directed to the transponder chip 66. When the transponder 66 emits a message to the read/write unit, the associated data are digitally coded via a parallel-connected series circuit of the field effect transistor 68 and resistor 70 via an auxiliary carrier, in that the resistor 70 is switched on and off via the field effect transistor 68.

A circuit as shown in FIG. 1 (a) can be provided for example both for use in a gate and also in a warehouse or sales room. In the gate, where little interference from other adjacent transponders is to be expected, in order to achieve a higher range of the transmission signal the frequency f(1) (namely in the present case 13.56 MHz) is used. On the other hand, the circuit for a device in a sales room is operated at a lower frequency f(2) (namely in the present case 6.78 MHz), where the fields of closely disposed transponders do not cause interference.

Figure 2:
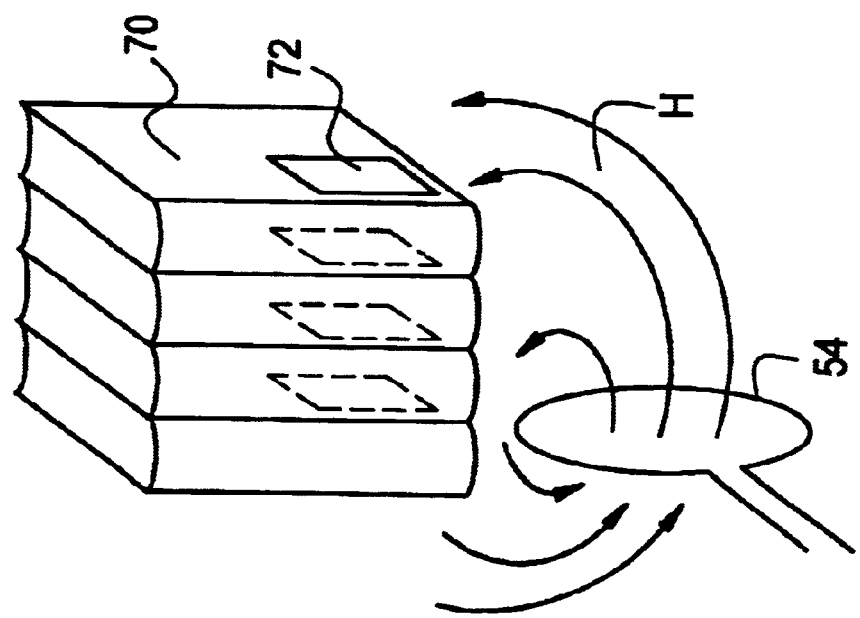
FIG. 2 shows an example for the use of RFID-labels in accordance with invention in a bookshelf.
Figure 4:
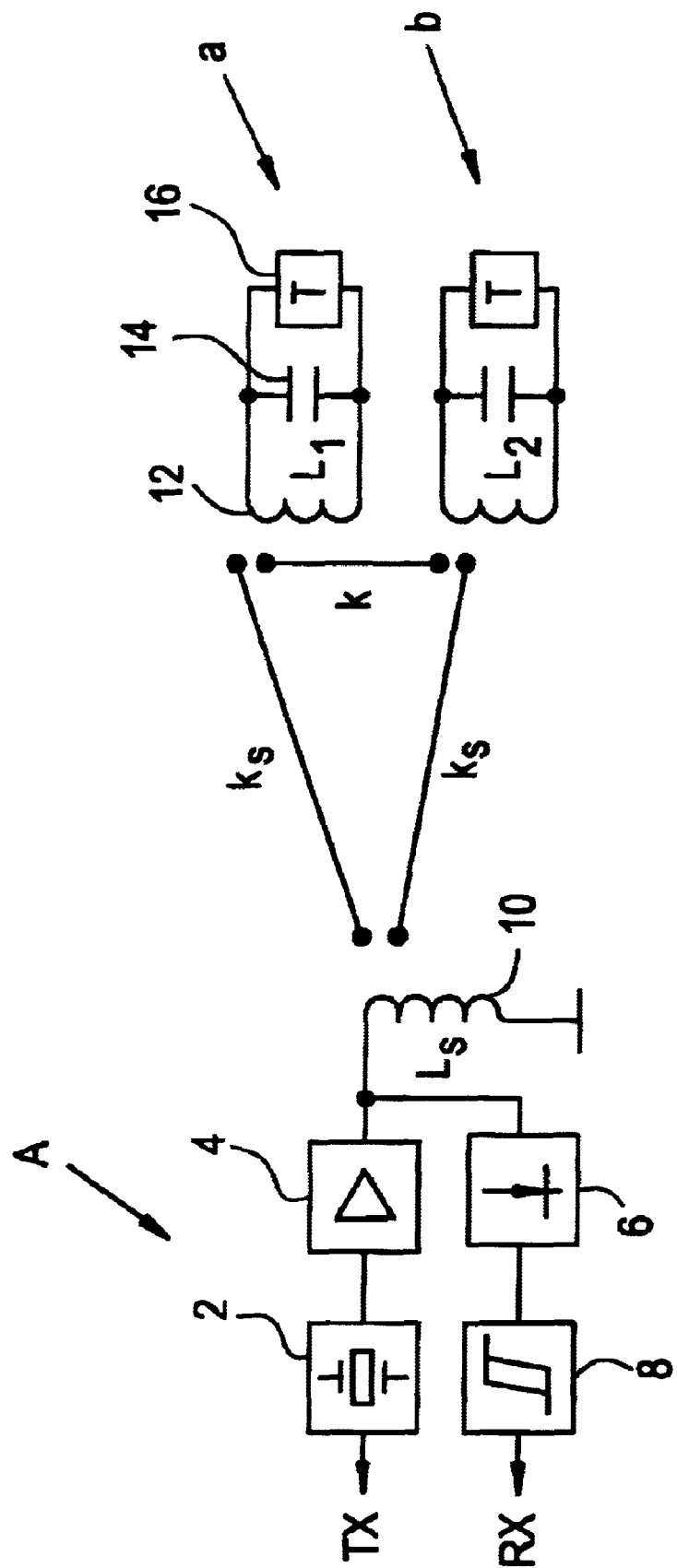
FIG. 4 shows replacement circuit diagrams of transmitter/receiver and transponder circuit for illustrating the coupling of two adjacent transponders.
Figure 5:
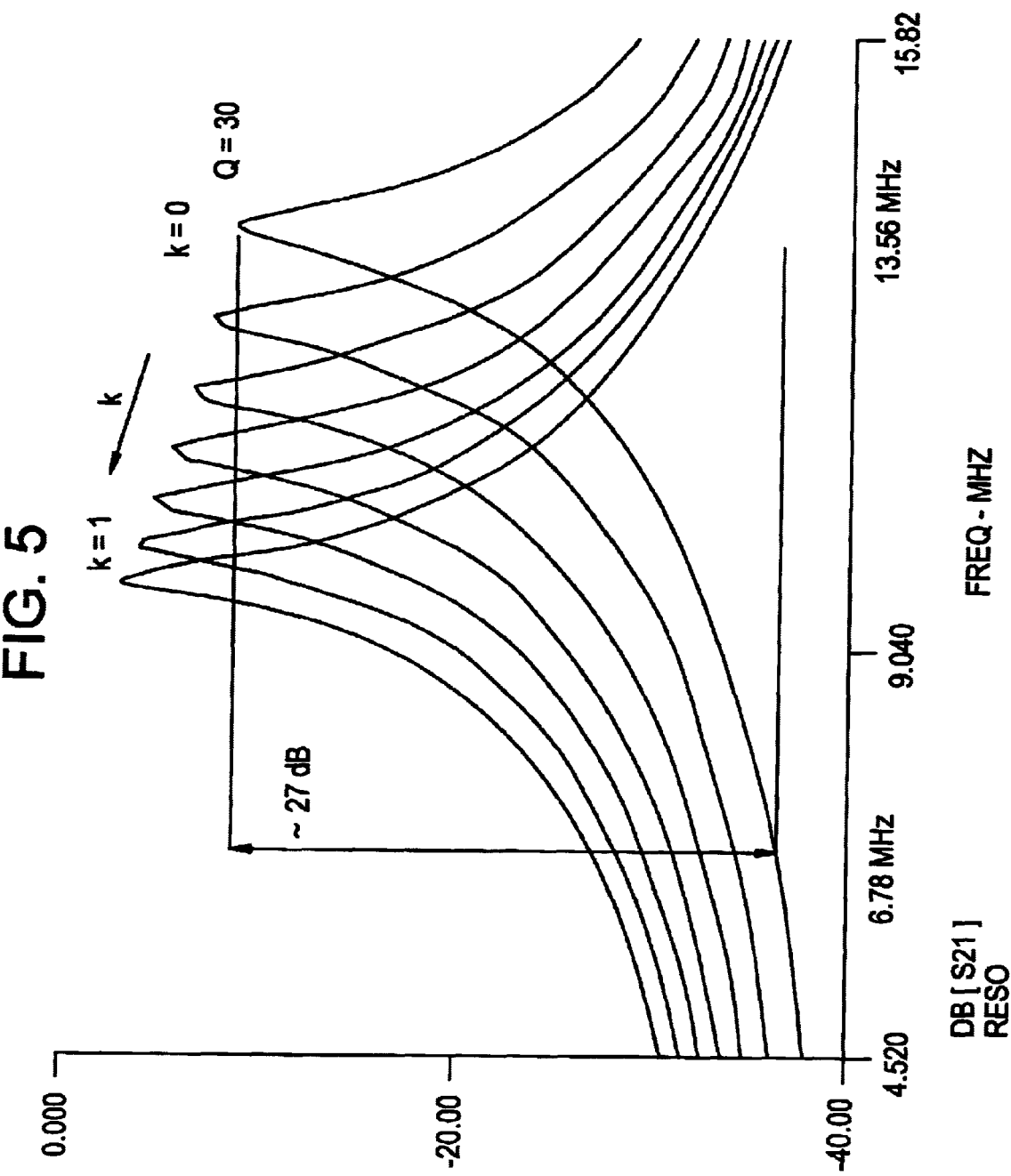
FIG. 5 shows an illustration of the simulation of the process of undesired coupling between two adjacent RFID-labels with identical resonance frequency.
Figure 6:
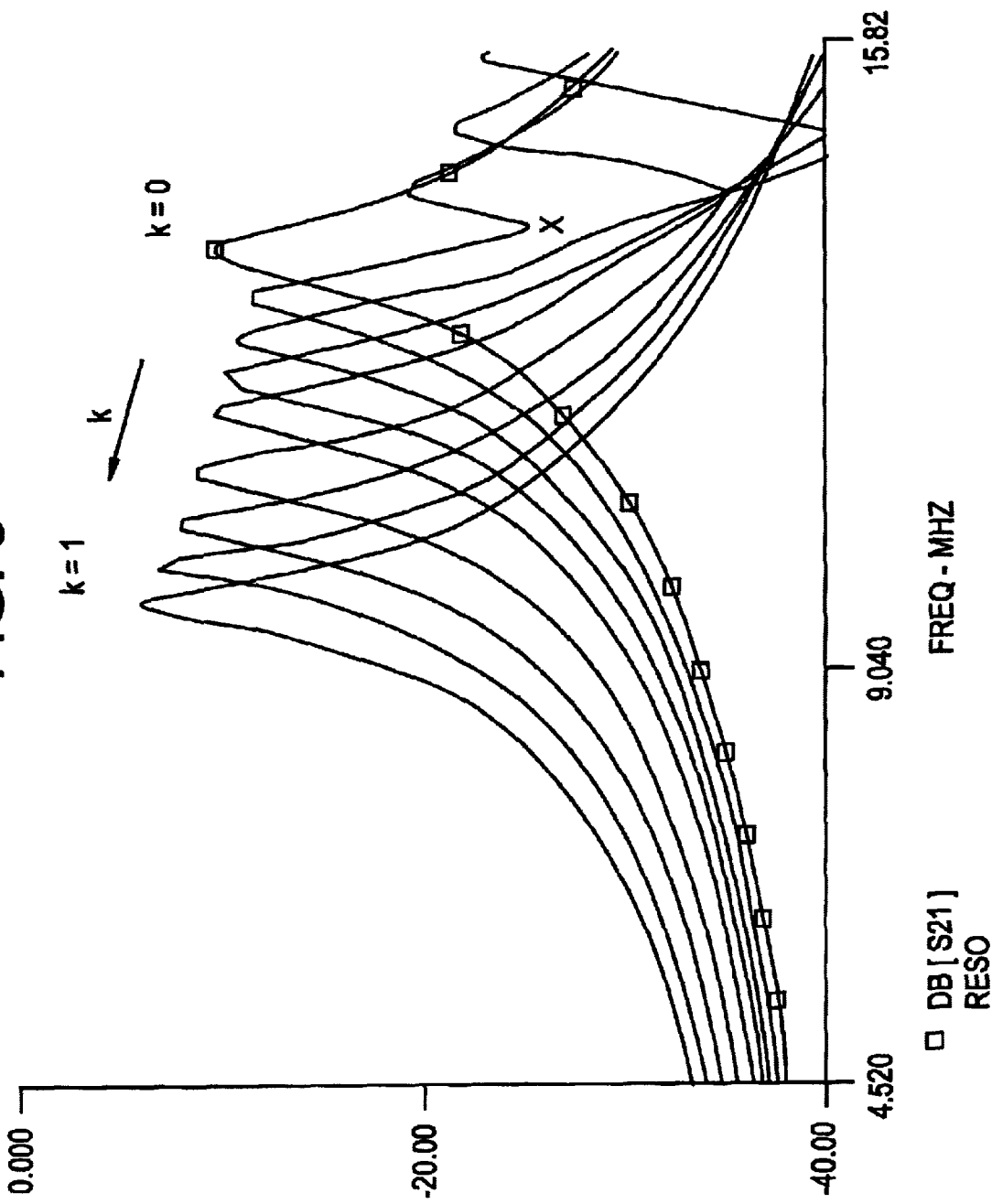
FIG. 6 shows an illustration of the simulation of the process of undesired coupling between two adjacent RFID-labels with different resonance frequencies.

FIG. 2 illustrates an example for the use of the method in accordance with the invention in the case of RFID-labels for books. By way of example, RFID-labels 72 with a resonance frequency 13.56 MHz are adhered to the inside of the covers of books 70 which stand on a shelf [not illustrated]. By reason of the uniform manner in which the RFID-labels 72 are attached they are more or less in alignment with each other so that their coils are essentially one on top of the other and they function as a common coil. The flow of the magnetic field and the through-flow of the transmission and transponder antennae is illustrated by H. In the case of a transmission frequency of 13.56 MHz considerable interference would occur until the transponder signals disappeared. By using a transmission device at 6.78 MHz it is possible for the transponder signals to be received in a reliable manner.

A similar case arises in the example illustrated in FIG. 3 with a document file. The RFID-labels 72 with a resonance frequency 13.56 MHz are attached in each case to a corner region of a document 74 and likewise cover each other, so that in the case of a transmission frequency of 13.56 MHz considerable interference would occur (see also magnetic field H). Also here a transmission frequency of 6.78 MHz is advantageously used.

What is claimed is:

1. Method for reading out and writing to RFID-transponders with inductive coupling comprising a read/write unit with a transmission frequency $f_{s1}$ defined as a basic transmission frequency and a plurality of transponders operated at a resonance frequency $f_R$, comprising the steps of:

fixedly predetermining the resonance frequency $f_R$, for operating conditions with a high distance range, selecting the resonance frequency $f_R$ equal to the basic transmission frequency $f_{s1}$, and for operating conditions with a high recognition rate with a plurality of transponders located within a detection field, reducing the basic transmission frequency $f_{s1}$ to a fixed alternative value $f_{s2}$, thereby guaranteeing reliable communication between the transponders and the read/write unit.

2. Method according to claim 1, wherein the alternative value $f_{s2}$ for the transmission frequency is half of the basic transmission frequency $f_{s1}$.

3. Method according to claim 1, wherein several alternative transmission frequencies below the basic transmission frequency $f_{s1}$ are used.

4. Method according to claim 1, wherein the resonance frequency is 13.56 MHz and as transmission frequencies are 13.56 MHz and 6.78 MHz.

5. Method according to claim 1, wherein the resonance frequency is 27.125 MHz and the transmission frequencies are 27.125 MHz, 13.56 MHz and 6.78 MHz.

6. System for reading out and writing to inductively coupled RFID-transponders for implementing the method in accordance with claim 1, comprising:

a transponder disposed on a carrier and having a resonance circuit with a resonance frequency $f_R$, a receiving unit, and a read/write unit with a transmitter/receiver and transmission frequency $f_{s1}$ defined as a basic transmission frequency, wherein the resonance circuit has a fixed resonance frequency $f_R$ and the transmitter/receiver of the read/write unit has a transmission basic frequency $f_{s1}$ equal to the resonance frequency $f_R$ of the transponder and a fixed alternative lower transmission frequency $f_{s2}$.

7. System according to claim 6, wherein the transmitter/receiver is adjustable to transmit a plurality of alternative lower transmission frequencies.

* * * * *